United States Patent [19]

Haines

[11] 4,021,924
[45] May 10, 1977

[54] DIP STICK

[75] Inventor: Walter E. Haines, Bloomfield Hills, Mich.

[73] Assignee: Estan Manufacturing Company, Troy, Mich.

[22] Filed: July 23, 1975

[21] Appl. No.: 598,326

[52] U.S. Cl. .................................. 33/126.7 R
[51] Int. Cl.² ................................ G01F 23/04
[58] Field of Search ............... 33/126.7 R, 1 H; 73/343 R, 343 B, 349, 344

[56] References Cited

UNITED STATES PATENTS

| 1,890,607 | 12/1932 | Hite | 33/308 |
| 2,705,372 | 4/1955 | Cornell | 33/126.7 R |
| 2,862,782 | 12/1958 | Cann, Sr. | 33/126.7 R X |
| 3,571,937 | 3/1971 | Sears | 33/1 H |
| 3,885,317 | 5/1975 | Karls | 33/126.7 A |

FOREIGN PATENTS OR APPLICATIONS 521,727  3/1955  Italy ............................. 33/126.7 R Primary Examiner—William D. Martin, Jr.
Attorney, Agent, or Firm—McGlynn and Milton

[57] ABSTRACT

A fluid-level indicating device, such as a dip stick, adapted for insertion into the access tube of a fluid reservoir wherein the device includes a friction reducing member at the leading end of the measuring member for facilitating free passage of the measuring member through an irregularly-shaped access tube.

14 Claims, 9 Drawing Figures

U.S. Patent    May 10, 1977    4,021,924
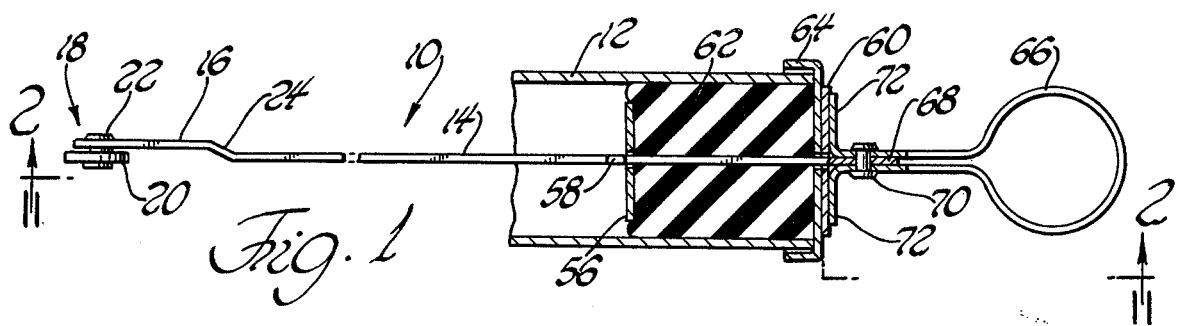
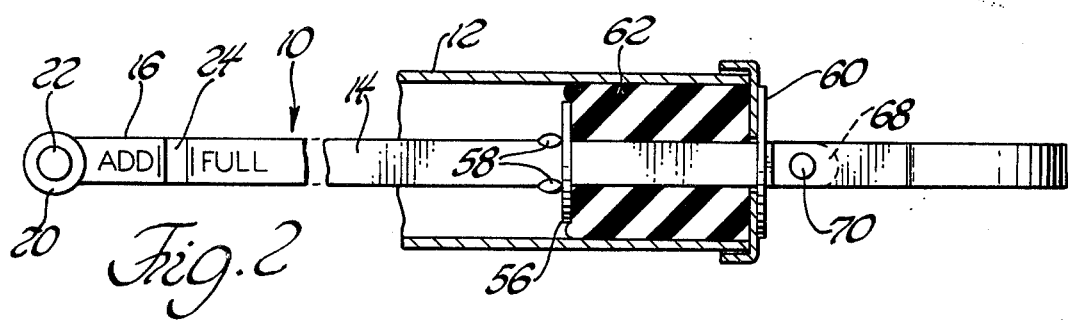
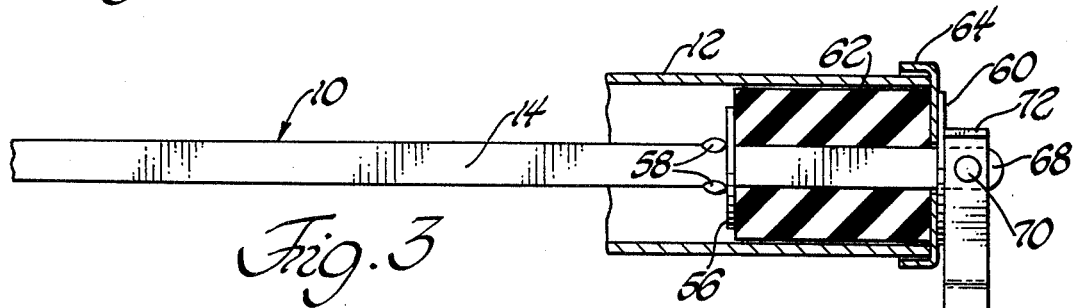
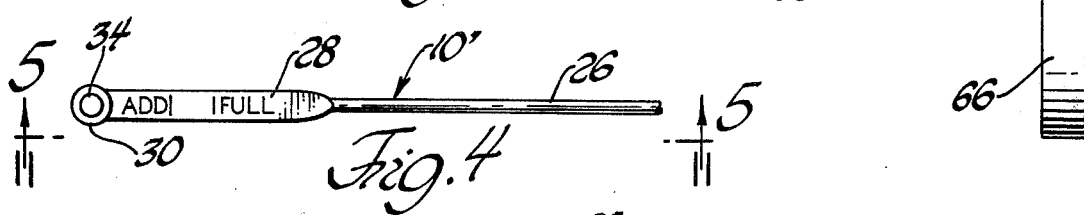
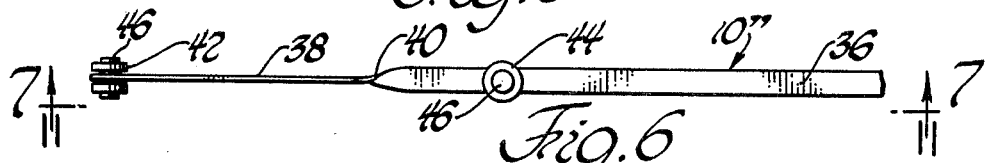
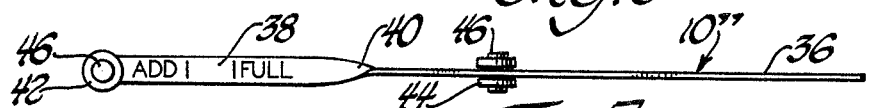
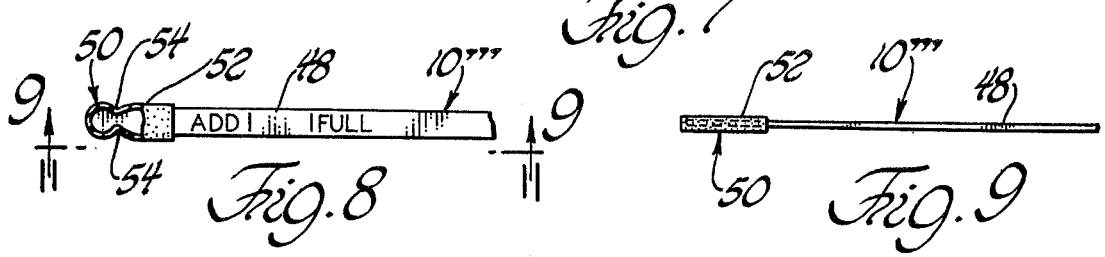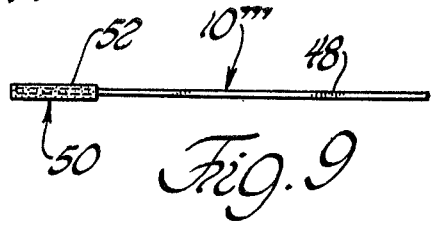

DIP STICK

This invention relates to a dip stick or ullage rod for measuring the amount by which a fluid reservoir or container falls short of being full. This invention is particularly suited for measuring various fluid levels in vehicles, such as, the oil level in an engine crank case or the level of transmission fluid in a vehicle transmission.

As is well-known, almost all combustion engines include some means for measuring the amount of lubricating oil to permit replenishing thereof should the lubricating oil fall below a certain level. The simplest, and probably the most well-known, measuring means comprises the common dip stick. Generally, an access tube is provided which extends from the top of the engine into the crank case. The access tube is adapted to receive a dip stick which includes an elongated, usually flat, flexible member which extends through the tube and into the crank case. The end of the dip stick is provided with suitable fluid-level measuring-indicia so that when the dip stick is removed from the access tube, the amount by which the lubricating oil in the crank case falls short of being full can be determined. Vehicles with automatic transmissions oftentimes include a similar device for measuring the amount of transmission fluid.

In the past, the access tube for the crank case or transmission of vehicles has been straight or, at most, has included a relatively slight, simple bend. In the past few years, particularly in automotive vehicles, due to the size of the engine compartment, the size of the engine, and the large number of accessories which have been added to the engine, such as, air-conditioning and pollution control equipment, automotive engineers have found it increasingly difficult to locate the access tubes. As a result, the access tubes of current automotive vehicles oftentimes have a number of bends, one or more of which may be compound bends. As referred to herein, a compound bend is one in which an angular change occurs in more than one plane. Additionally, such access tubes may include two or more consecutive bends which lie in different planes. Such irregularly-shaped access tubes make it exceedingly difficult to insert the dip stick.

With regard to dip sticks having a flat cross section, the problem arises as a result of the resistance of the dip stick to bending motion in the plane parallel to its flat surface. When a bend in the access tube requires that the dip stick bend in this plane, the leading end of the dip stick tends to engage and drag along the wall of the access tube on the outside of the bend thus hindering passage of the dip stick through the tube. In other words, the end of the dip stick jams against the sides of the access tube in the vicinity of bends, thus inhibiting or preventing free movement of the dip stick through the tube. This problem is also encountered in dip sticks having round cross sections since once the dip stick has been curved in one plane, it resists bending in other planes.

Heretofore, little or no effort has been made to alleviate the above-described problem associated with dip sticks or ullage rods. Accordingly, the instant invention provides friction reducing means mounted on the leading end of the dip stick or ullage rod for faciliating free passage of the dip stick through the access tube. The friction reducing means accomplishes this purpose by reducing the tendency of the end of the dip stick to jam against the walls of the tube thus permitting movement of the dip stick therethrough.

Other advantages of the present invention will be readily appreciated as the same becomes better understood by reference to the following detailed description when considered in connection with the accompanying drawings wherein:

FIG. 1 is a side-elevational view of a dip stick constructed in accordance with the instant invention;

FIG. 2 is a view taken generally along line 2—2 of FIG. 1;

FIG. 3 is a view similar to FIG. 2 showing a moved position of an element of the dip stick;

FIG. 4 is a side-elevational view of another embodiment of the instant invention;

FIG. 5 is a view taken generally along line 5—5 of FIG. 4;

FIG. 6 is a side-elevational view of a further embodiment of the instant invention;

FIG. 7 is a view taken generally along line 7—7 of FIG. 6;

FIG. 8 is a side-elevational view of a further embodiment of the instant invention; and FIG. 9 is a view taken generally along line 9—9 of FIG. 8.

Referring more particularly to FIGS. 1, 2 and 3 of the drawings, a dip stick or ullage rod, generally shown at 10, the drawings, a dip stick or ullage rod, generally shown at 10, is positioned within an access tube 12. For convenience, only the entrance end of the access tube 12 is shown. It is to be understood, however, that the access tube 12 is of the standard and well-known variety which extends from a convenient, accessible location in the engine compartment to the reservoir which holds the fluid to be measured. For example, the access tube may extend from the vicinity of the top of the engine into the crank case so that, when in place, the dip stick extends into the oil pan beyond the end of the access tube to enable measurement of the amount of oil. It is also understood that the access tube may be of an irregular shape in that it includes a plurality of simple or compound bends in multiple planes.

The fluid level indicating device 10 includes an elongated, flexible measuring member 14. The measuring member 14 may comprise a flat, metal stamping. As used herein, flat means a member having little depth or thickness, that is, a member which is relatively broad and thin in its transverse dimensions. At its leading, or far end, the measuring member 14 includes a surface 16 for receiving fluid-level-measuring indicia of the sort commonly encountered. Specifically, a pair of axially-spaced, transversely extending lines are provided, the one closest to the end of the measuring member 14 being marked "add" and the other being marked "full". Such indicia, of course, indicates when additional fluid must be added to maintain a full condition.

In order to facilitate free passage of the measuring member 14 through the access tube 12, the leading end of the measuring member 14 includes friction reducing means generally shown at 18. As shown in FIGS. 1 and 2, the friction reducing means 18 comprises a roller member 20. The roller member 20 is attached to the leading end of the measuring member 14 by suitable means, as a rivet 22, to permit free rotational movement thereof.

The roller member 20 is mounted or attached so that it rotates in a plane which is substantially parallel to the plane of the flat measuring member 14. In other words, the axis of rotation of the roller member 20 is perpendicular to the plane in which the measuring member 14 demonstrates the greatest resistance to bending motion. The radius of the roller member 20 is sufficiently greater than the radius of the generally rounded end of the measuring member 14 so that the outer surface of the roller member 20 extends beyond the edges of the measuring member 14.

When a single roller is employed, it is also desirable to position the roller 20 near the central axis of the measuring member 14. This will reduce the possibility of the roller member 20 catching the lower end of the access tube 12 when it is being withdrawn from the tube. (As noted above, the end of the measuring member of the dip stick extends beyond the end of the access tube when it is in a fluid-measuring position.) Accordingly, the measuring member 14 includes a step-bend 24 which is located in the vicinity of the roller member 20. The step-bend 24 positions the roller member 20 so that it is more symmetrical with respect to the central axis of the measuring member 14. Locating the roller member 20 in this fashion also enhances its primary function of facilitating passage of the measuring member through the access tube 12.

When the fluid-level indicating device 10 is inserted into the access tube 12, the roller member 20 greatly facilitates free passage of the measuring member 14 therethrough. Specifically, since the roller member 20 is mounted so that its axis of rotation is perpendicular to the plane of the measuring member 14, which demonstrates the most resistance to bending, the roller member 20 engages the walls of the access tube 20 and prevents the leading end of the measuring member 14 from scraping against, or otherwise binding with, the walls of the access tube 12. The measuring member 14 is thereby forced to bend against any resistance without jamming thus permitting free and easy movement through the tube.

FIGS. 4 and 5 illustrate an alternate embodiment of the instant invention. In this embodiment, the fluid-level indicating device, generally shown at 10', includes an elongated, flexible measuring member 26 which has a cylindrical cross section over a major portion of its length. The leading end of the measuring member 26, however, includes a flat portion 28 which defines a surface for receiving fluid-level-measuring indicia. A pair of rollers 30 and 32 are rotatably mounted by means of a rivet 34 on opposite sides of the flat portion 28. As in the first embodiment, the roller members are mounted to rotate in a plane which is substantially parallel to the plane of the flat portion 28. The radius of both roller members 30 and 32 is sufficiently larger than the end of the flat portion 28 so that the external surfaces of the roller members 30 and 32 extend beyond the edges of the flat portion 28. As should be apparent, the roller members 30 and 32 function in a similar manner as the roller member 20 of the first embodiment. Specifically, the roller members 30 and 32 facilitate passage of the measuring member 26 through an access tube by reducing frictional engagement of the leading end of the measuring member 26 with the walls of the access tube 12.

A third embodiment of the instant invention is shown in FIGS. 6 and 7. In this embodiment, the fluid-level indicating device, generally indicated at 10", includes an elongated, flexible measuring member 36 having a flat cross section similar to that of the embodiment shown in FIGS. 1 and 2. The flat measuring member 36 naturally provides a surface 38 near the leading end thereof for receiving suitable fluid-level-measuring indicia. An axial twist 40 is formed in the measuring member 36 near the leading end thereof. Roller members 42 and 44 are rotatably mounted to the measuring member 36 on opposite sides of the axial twist 40. In the embodiment shown, a pair of roller members are attached to the measuring member 36 at each location by means of a suitable rivet 46.

Due to the axial twist 40 the pairs of roller members 42 and 44 rotate in planes which are angularly displaced with respect to one another. Although various twist angles may be employed, it has been found desirable to employ an axial twist of approximately 90°. Accordingly, the planes of rotation of the roller members 42 and 44 are also displaced approximately 90°. By providing roller members which rotate in two orthogonally related planes, bending movement of the measuring member 36 is not only aided in the plane of greatest resistance, but also in planes of lesser resistance. In this manner, free passage of the measuring member through the access tube 12 is further insured.

A fourth embodiment of the instant invention is shown in FIGS. 8 and 9. In this embodiment the fluid-level indicating device, generally shown at 10''', also includes a flat portion 48 near the leading end thereof which defines a surface for receiving fluid-level-measuring indicia. As should be apparent in all of the embodiments, the flat portion 48 may either be the end of a measuring member which has a flat cross section over its entire length or a measuring member having a circular cross section which is flattened at its leading end.

In this embodiment of the invention the friction reducing means, generally shown at 50, includes a sleeve member 52 which is made from a friction reducing material, such as, a plastics material which has a low coefficient of friction. As shown, the sleeve member 52 is disposed on the leading end of the measuring member to prevent gouging or binding or the leading end with the inner walls of the access tube 12. Means for anchoring the sleeve member 52 on the end of the measuring member may be provided. Such means may comprise a pair of notches 54, or any other irregularity which is capable of establishing gripping engagement between the measuring member and the sleeve member 52.

It has been found that the sleeve member 52 can be made from a heat-shrinkable plastics material. Such material is very well-known and is commercially available at relatively low cost. In order to use heat-shrinkable plastics material in the manufacture of the dip stick, a sleeve member 52 can be formed by cutting a piece of the material, which is available in the form of tubing, to an appropriate length. The sleeve member 52 is then slipped over the end of the measuring device and is subsequently heated. The material shrinks and engages the end of the measuring device and also shrinks into the notches 54 to secure it in place.

It is noted that a sleeve member 52 of any length may be provided. In other words, the sleeve member 52 may extend a greater distance along the measuring device than as shown in FIGS. 8 and 9. Of course, if the sleeve member extends over the fluid-level-measuring indicia, the sleeve member 52 should be clear, or transparent, so that the indicia remains visible.

The fluid-level indicating device also includes means for sealing the open end of the access tube 12. Accordingly, sealing means is provided which includes a first plate member 56 which is mounted on the measuring member 14 and is fixed thereto. For this purpose, a pair of dimples 58 may be pressed into the measuring member 14 to prevent sliding movement of the plate 56. A second plate 60 is provided through which the measuring member 14 extends. A resilient, compressible sealing member 62 having a generally cylindrical shape is disposed between the plates 56 and 60. A cap member 64 may also be provided for loosely encircling the open end of the access tube 12.

A dual lever and handle member 66 is pivotally attached to the end 68 of the measuring member 14 which extends through the plate 60. The lever/handle member 66 is preferably attached thereto by means of a rivet 70, or other sutable device. The lever/handle member 66 also includes a pair of legs 72 which extend beyond the pivot point on the side opposite the handle portion.

When the lever/handle member 66 is in the position shown in FIG. 3, the sealing material is relaxed and a slipfit exists between the sealing member 62 and the inner walls of the access tube 12. In this condition the measuring member 14 may be removed and reinserted into the access tube 12. When the measuring member 14 is in place, the lever/handle member 66 is pivoted about the pivot point to the position shown in FIGS. 1 and 2. During such movement, the end 68 of the measuring member 14 is drawn out of the access tube a slight distance. Such movement is caused because the length of the legs 72 is greater than the distance between the pivot point of the lever/handle member 66 and the second plate 60 when the sealing member 62 is in the relaxed condition. When the lever/handle member 66 is pivoted, the legs 72 cam against the plate 60 drawing the end 68 of the measuring member 14 through the plate 60. Consequently, the first plate 56 is moved closer to the second plate 60 thereby compressing the sealing member 62 in its axial dimension causing it to expand radially against the sides of the access tube 12. In this condition, the access tube is sealed and the measuring member 14 cannot be removed nor can fluid splash out the end of the access tube 12 or vapors escape therethrough.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privelege is claimed are defined as follows:

1. A fluid-level indicating device adapted for insertion into the access tube of a fluid reservoir wherein the access tube has one or more bends, the device comprising: an elongated, flexible measuring member, said member including a surface near one end thereof for receiving fluid-level-measuring indicia and friction reducing means mounted on the leading end of said measuring member; said friction reducing means having a dimension greater than the width of said measuring member to hold the leading end of said measuring member away from the walls of the access tube to prevent binding of the leading end with the walls of the access tube thereby facilitating free passage of said measuring member through the access tube.

2. A device as set forth in claim 1 wherein said friction reducing means includes a roller member rotatably attached to the leading end of said measuring member.

3. A device as set forth in claim 2 wherein the leading end of said measuring member includes a flat portion and said roller member is mounted to rotate in a plane which is substantially parallel to the plane of said flat portion.

4. A device as set forth in claim 3 wherein said measuring member includes a step-bend in the vicinity of the roller member for positioning said roller member with respect to the central axis of said measuring member.

5. A device as set forth in claim 1 wherein said friction reducing means includes a pair of roller members, each roller member being rotatably mounted on opposite sides of said measuring member at the leading end thereof.

6. A device as set forth in claim 5 wherein the leading end of said measuring member includes a flat portion and said roller members are mounted to rotate in a plane which is substantially parallel to the plane of said flat portion.

7. A device as set forth in claim 1 wherein the leading end of said measuring device includes a flat portion, said flat portion including an axial twist and said friction reducing means including at least one roller member rotatably mounted to said flat portion on opposite sides of said axial twist whereby said roller members rotate in planes which are angularly displaced with respect to one another.

8. A device as set forth in claim 7 wherein said axial twist orients the planes of rotation of said roller members at an angle of approximately 90°.

9. A device as set forth in claim 7 wherein a pair of roller members are mounted on each side of said axial twist for rotation in a plane which is substantially parallel to the plane of said flat portion.

10. A device as set forth in claim 1 wherein said friction reducing means includes a sleeve member made of a friction reducing material disposed on the leading end of said measuring member.

11. A device as set forth in claim 10 wherein the leading end of said measuring member includes a flat portion, said flat portion including means for anchoring said sleeve member.

12. A device as set forth in claim 11 wherein said anchoring means includes a pair of notches.

13. A device as set forth in claim 11 wherein the material of said sleeve member is a heat-shrinkable plastics material.

14. A device as set forth in claim 1 wherein said measuring member includes a first plate member carried by said measuring member and being fixed thereto to move therewith in at least one direction, a second plate member carried by said measuring member and spaced apart from said first plate member, said measuring member being movable with respect to said second plate member, a compressible sealing member surrounding said measuring member and disposed between said plate members, and a lever member pivotally attached to said measuring member, said lever member including cam means for engaging said second plate member to move said measuring member relative to said second plate member when said lever member is pivoted, whereby the distance between said plate members is diminished to compress said sealing member in an axial direction and expand it in a radial direction.

* * * * *